United States Patent
Al Ahbabi et al.

(10) Patent No.: US 11,561,137 B1
(45) Date of Patent: Jan. 24, 2023

(54) APPARATUS FOR THAW DETECTION OF A FROZEN ITEM AND METHOD OF MANUFACTURING THE SAME

(71) Applicant: University of Sharjah, Sharjah, AE (US)

(72) Inventors: Aktham Al Ahbabi, Sharjah (AE); Muhannad Abd, Sharjah (AE); Zaid Al-Sadoon, Sharjah (AE); Mohamed Al Hemairy, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 17/499,188

(22) Filed: Oct. 12, 2021

(51) Int. Cl.
G01K 11/06 (2006.01)

(52) U.S. Cl.
CPC .................... G01K 11/06 (2013.01)

(58) Field of Classification Search
None
See application file for complete search history.

(56) References Cited

U.S. PATENT DOCUMENTS

| | | | | |
|---|---|---|---|---|
| 2,460,215 A * | 1/1949 | Chase | G01N 31/222 | 116/216 |
| 2,662,018 A * | 12/1953 | Smith | G01K 11/12 | 62/123 |
| 2,951,764 A * | 9/1960 | Chase | G01N 31/222 | 426/88 |
| 3,220,259 A * | 11/1965 | Beyer | G01N 33/02 | 374/E3.004 |
| 3,597,973 A * | 8/1971 | Ryder | H01M 50/60 | 73/447 |
| 4,144,834 A * | 3/1979 | Donegan | G01K 11/06 | 374/E11.006 |
| 4,664,056 A * | 5/1987 | Jehanno | G01K 5/483 | 374/E11.006 |
| 5,111,768 A * | 5/1992 | Larsson | G01K 11/06 | 374/E11.006 |
| 5,158,364 A * | 10/1992 | Labes | G01K 11/165 | 374/162 |
| 6,335,200 B1 * | 1/2002 | Tiru | G01K 11/12 | 374/E11.006 |
| 7,387,438 B2 * | 6/2008 | Parker | G01K 11/06 | 374/E11.006 |
| 7,770,534 B2 * | 8/2010 | Cooperman | G01K 3/005 | 374/106 |
| 9,279,732 B2 * | 3/2016 | Parker | G01K 11/06 | |
| 2004/0253733 A1 * | 12/2004 | Prusik | G01N 31/229 | 436/2 |
| 2008/0110391 A1 * | 5/2008 | Taylor | G01K 3/04 | 374/E11.006 |

* cited by examiner

*Primary Examiner* — Nimeshkumar D Patel
*Assistant Examiner* — Tania Courson
(74) *Attorney, Agent, or Firm* — Hayes Soloway PC (57) ABSTRACT

An apparatus for thaw detection of a frozen item is disclosed, the apparatus comprising a housing container comprising a first transparent section and a second opaque section, at least one low density floating object and at least one high density object both encased within the housing container, wherein the housing container is filled with a filling mixture and melting of the filling mixture results in the at least one low density floating object and at least one high density object to be visible in the first transparent section of the housing container, thereby enabling thaw detection of the frozen item. Also disclosed is a method of manufacturing an apparatus for thaw detection of a frozen item.

20 Claims, 7 Drawing Sheets

APPARATUS FOR THAW DETECTION OF A FROZEN ITEM AND METHOD OF MANUFACTURING THE SAME

FIELD OF THE INVENTION

The present invention relates to an apparatus for thaw detection of a frozen item and a method of manufacturing the same, and more particularly for an apparatus for detecting whether a frozen item has been previously thawed or exposed to a temperature of 0° C. or more during transport or storage.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

There is increasing global consumption of frozen foods due to their low cost, malleability to long-term storage, and ease of transport. However, the danger of Food-poisoning bacteria can grow in frozen food while it is thawing. To avoid thawing frozen food and exposure to the temperature danger zone some means detection is favorable to indicate whether frozen items have been previously thawed. A number of devices mostly sensors have been invented to detect whether a thawing and subsequent freezing have taken place. There is an evident lack of reliable techniques to monitor the condition of these subjects during transport from the production site and to the consumer. Although, the available electronic devices only give readings of the average temperature of the whole freezing the use of such apparatus with each and not every item in the frozen food is both totally impracticable and prohibitively costly.

Therefore, there exists a need for a solution for the above listed drawbacks associated with traditional impedance measurement methods, and which proves to be a remedy for the same.

SUMMARY OF THE INVENTION

Therefore it is an object of the present invention to propose an apparatus for thaw detection of a frozen item and a method of manufacturing the same.

In an aspect of the invention, an apparatus for thaw detection of a frozen item is disclosed, the apparatus comprising a housing container comprising a first transparent section and a second opaque section, at least one low density floating object and at least one high density object both encased within the housing container, wherein the housing container is filled with a filling mixture and melting of the filling mixture results in the at least one low density floating object and at least one high density object to be visible in the first transparent section of the housing container, thereby enabling thaw detection of the frozen item.

In an embodiment of the present invention, the housing container is conical in structure.

In another embodiment of the present invention, the first transparent section is towards a base of the housing container and the second opaque section is towards an apex of the housing container.

In another embodiment of the present invention, the housing container is made of a transparent and flexible plastic material.

In another embodiment of the present invention, the housing container is made of polyethylene.

In another embodiment of the present invention, the filling mixture has a melting point of 0 to 4° C.

In another embodiment of the present invention, the filling mixture comprises a mixture of grated ice and D-ethanol.

In another embodiment of the present invention, the filling mixture further comprises a white colored food dye.

In another embodiment of the present invention, the low density floating object and the high density object are differently colored balls.

In another embodiment of the present invention, the low density floating object has a density value less than 1 $gm/cm^3$.

In another embodiment of the present invention, the high density object has a density value greater than 1 $gm/cm^3$.

In another embodiment of the present invention, the low density floating object is made of a light weight material such as polystyrene.

In another embodiment of the present invention, the high density object is made of a heavy material such as polypropylene.

As another aspect of the present invention, a method of manufacturing an apparatus for thaw detection of a frozen item is disclosed, the method comprising the steps of placing at least one low density floating object and at least one high density object within a housing container comprising a first transparent section and a second opaque section, filling up the housing container with a filling mixture, wherein melting of the filling mixture results in the at least one low density floating object and at least one high density object to be visible in the first transparent section of the housing container, thereby enabling thaw detection of the frozen item.

In an embodiment of the present invention, the filling mixture has a melting point of 0 to 4° C.

In another embodiment of the present invention, the filling mixture comprises a mixture of grated ice and D-ethanol.

In another embodiment of the present invention, the housing container is made of a transparent and flexible plastic material.

In another embodiment of the present invention, the apparatus is placed in contact with the frozen item during operation.

In another embodiment of the present invention, the low density floating object has a density value less than 1 $gm/cm^3$.

In another embodiment of the present invention, the high density object has a density value greater than 1 $gm/cm^3$.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of an apparatus for thaw detection of a frozen item and a method of manufacturing the same, according to the present invention will be described in conjunction with FIGS. 1-6. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes an apparatus for detecting exposure of a frozen commodity or item to a high temperature (temperatures above 0° C.) during transportation and storage of the same. The invention aims to propose a simple, affordable and compact device to detect whether frozen foods have been exposed to temperatures close to 0° C. or more during the storage and/or transport to a consumer's freezer, based on the type of item or food (meat, fruit or vegetable). The device is placed amongst or within the item or food and comprises a container or cone-shaped housing manufactured using plastic or a low-density polyethylene (LDPE), which is safe for food contact.

Several important factors affecting the condition of frozen foods necessitated the design of this device. First, there is the increasing global consumption of frozen foods due to their low cost, malleability to long-term storage, and ease of transport. However, there is an evident lack of reliable techniques to monitor the condition of such items during transport from the production site to the consumer (and those responsible could easily manipulate the readings of electronic means used to ensure that these foods are suitably frozen during storage and transport until they reach the consumer). Second, the available electronic devices only give readings of the average temperature of the whole freezing store, instead of areas of the store distant from the measuring device or near the doors of the store. Consequently, frozen items stored in such parts may be exposed to unacceptable temperatures without being detected. As a result, and in order to increase consumer confidence, there is a strong need to develop a solution for reducing incidents of poor storage and commercial fraud. The proposed device is a few millimeters-sized cone made of polyethylene which comprises at least two plastic objects and a grated mixture of ice and D-ethanol with a white food dye, all of which are food safe. The aim of this invention is to design a low-cost, safe and easy to use device for the benefit of both consumers and producers. This device is intended to ensure that frozen food products adhere to international food safety standards and have been safely stored and transported without being exposed to defrosting and refreezing. This would prevent the proliferation of bacteria and germs in the food product, something an average consumer would not be able to detect as they receive a refrozen product. Poor storage means the lack of proper safety measures starting from initial tests in specialized laboratories until the storage in freezers positioned at wholesale or retail sites. Owing to this, a food product may pass standardization and quality control tests in the laboratory although subjected to poor storage conditions in sale venues which renders it unsafe for human consumption.

Figure 1:
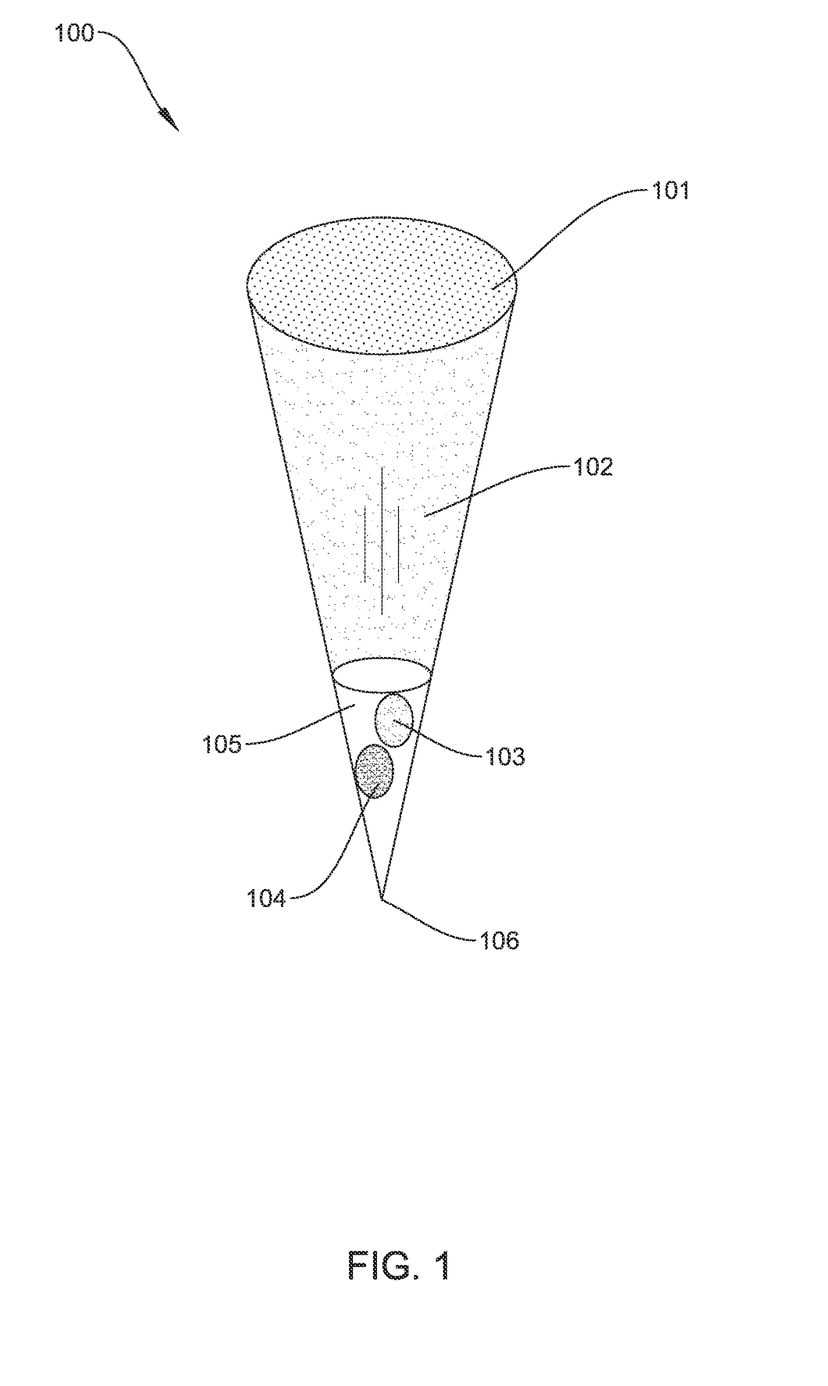
FIG. 1 is a perspective view of the thawing detection apparatus and its components, in accordance with the present invention.

FIG. 1 illustrates a thawing detection apparatus as a preferred embodiment of the current invention comprising a housing container or cone 100 or more particularly a cone shaped housing container. The housing container comprises a base portion 101 and an apex portion 106. The housing container 100 is made of a transparent flexible plastic, preferably polyethylene but may be made of any other suitable transparent material. A first section of the housing container or cone 100 starting from the vertex of the apex portion 106 is opaque. The opaque part 105 extends to include a $\frac{1}{4}^{th}$ part (or 25%) of the whole length of the housing container 100. The rest of the housing container ($\frac{3}{4}^{th}$ or 75%) is transparent, more particularly from the end of the opaque part till the base portion 101 of housing container or cone 100. The housing container 100 further comprises at least one low density floating object 103 and at least one high density object 104, both immersed and firmly positioned within the apex portion 106 of the housing container when in a frozen state. Brightly colored objects or balls are used to ensure clear visibility when released into the transparent part of the cone.

In an embodiment of the present invention, the low density floating object 103 and high density object 104 are differently colored balls, for example the low density floating object 103 colored bright red and the high density object 104 colored bright orange—although any other colors may be used. The low density floating object 103 is a ball is made of a light-weight material such as, but not limited to, polystyrene or any other such material thereof. The high density object 104 is made of a heavy material such as, but not limited to, polypropylene or any other such material thereof. The density of the balls according to current invention is selected such that density of the low density object 103 is less than 1 gm/cm$^3$ and density of the high density object is higher than 1 gm/cm$^3$.

As depicted in FIG. 1, the said housing container 100 is filled using a solution comprising grated ice and D-ethanol mixture which melts at temperatures close to 0° C. (as water melts when it reaches a range of 0-4° C.). When the solution reaches a temperature below the freezing point of water, at that point the low density and high density objects 103 and 104 are completely immersed, invisible and firmly positioned within the opaque apex portion 106 of the housing container 100—which indicates that the frozen item was not exposed to a temperature of 0° C. or more. In accordance with the present invention, as long as the low density and high density objects 103 and 104 are invisible and encased in the opaque apex portion 106 of the housing container 100, this is an indication that an item kept frozen did not thaw or was not subject to a temperature of 0° C. or more.

The housing container or cone 100 comprises of mainly two parts, a transparent portion 102 and an opaque portion 105 near the apex or vertex 106 of the housing container 100. The housing container 100 further comprises two plastic objects or balls—one which floats over water (density less than 1 gm/cm$^3$) 103 and made of low-density polystyrene and the other which sinks in water (density higher than 1 gm/cm$^3$) 104 and made of high-density polypropylene. The housing container or cone 100 also comprises a filling mixture 109 of grated ice and D-ethanol along with a white food dye.

The presence of a white food dye is useful in hiding the colored balls (103, 104) in the event that the grated ice does not melt and remains frozen. In the event that the ice melts resulting in the appearance of either of the colored balls, the white dye becomes an aid in distinguishing the ball that appeared, as a white background is better than a transparent background in distinguishing colors, especially if the frozen product is dark in color such as red meat, where it may be difficult to distinguish. Also, if the thaw detection apparatus is damaged during transportation, the food dye will be clear in addition to being non-toxic, thereby avoiding product damage.

In operation, when the item or food product is in a frozen state, the two objects (103 and 104) are present in the opaque portion 105 of the housing container or cone 100 and thereby unseen. However, if the temperature rises to around 0° C., the filling mixture 109 melts and releases one of the two objects into the transparent portion 102 of the housing container or cone 100. This occurs even when the food is refrozen. In addition, shape of the housing container or cone 100 is prone to change owing to melting of the grated ice mixture 109. The nature of this change depends on the position of the housing container or cone 100, its positioning and tilt, and these changes indicate that the frozen item has been exposed to temperatures higher than 0° C. during the stage between storage and transport.

Figure 2A:
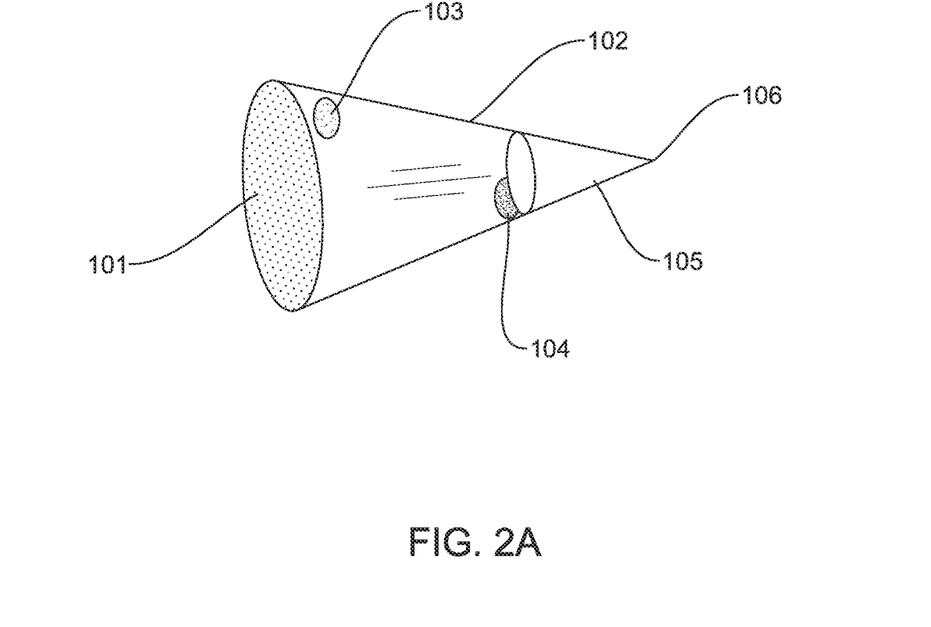
FIG. 2A is a perspective view of the thawing detection apparatus of the current invention in a horizontal position showing the high density red ball and low density ball visible indicating thawing of a frozen item.
Figure 2B:
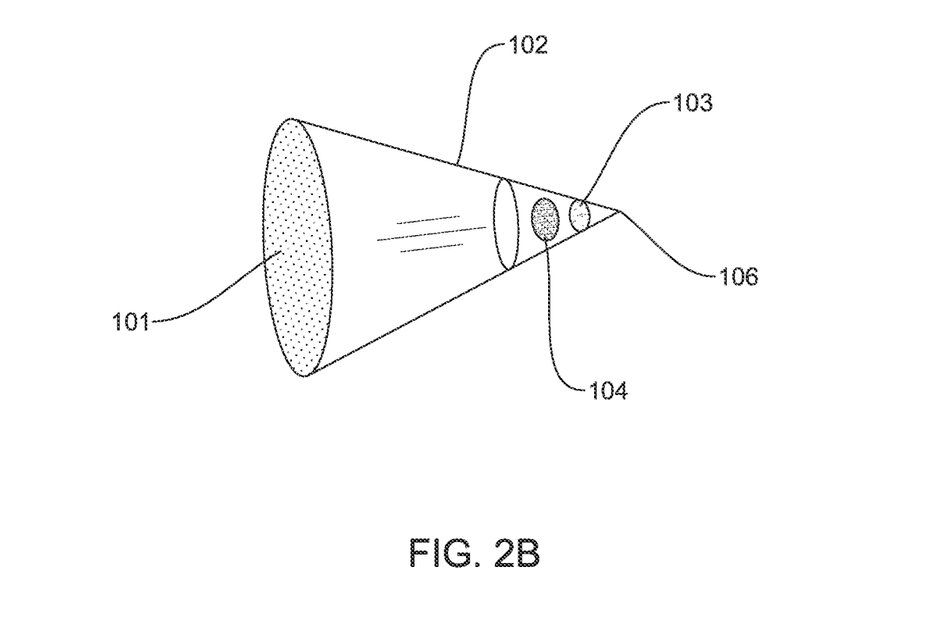
FIG. 2B is a perspective view of the thawing detection apparatus of the current invention in a horizontal position showing both the high density red ball and low density ball immersed, invisible and firmly positioned in the apex of the housing cone when the item is in a frozen state.

FIGS. 2A-2B depicts the scenario in the event of exposure of a frozen item to a temperature of 0° C. or more, illustrating the thaw detection apparatus 100 placed in a horizontal position wherein the apex portion 106 and base portion 101 are at a same horizontal level. Once the frozen item to has been subjected to a temperature of 0° C. or more, the low density floating object 103 floats toward the base portion (transparent section) 101 and the high density object 104 sinks within the apex portion 106. Accordingly, visibility of at least one of the objects indicates that the frozen item to has been subjected to a temperature of 0° C. or more.

Figure 3A:
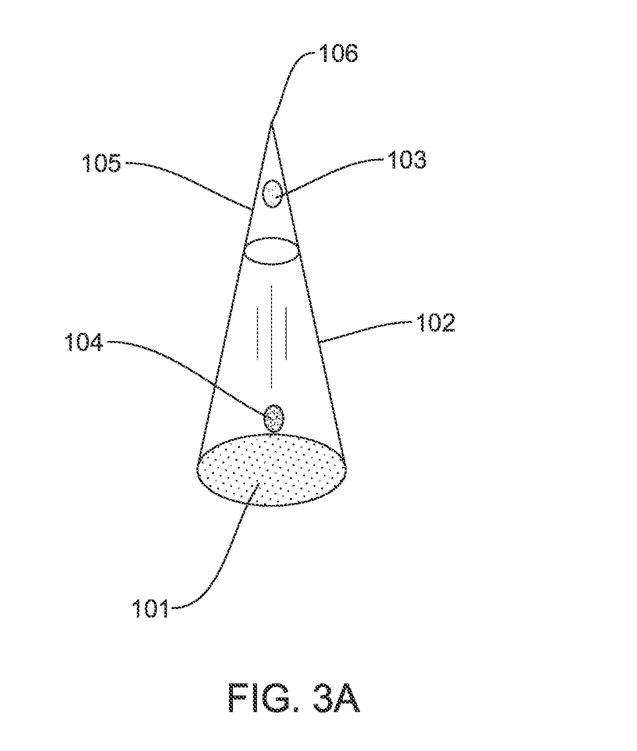
FIG. 3A is a perspective view of the thawing detection apparatus of the current invention in a vertical position when the apex of the housing cone directed upwards.
Figure 3B:
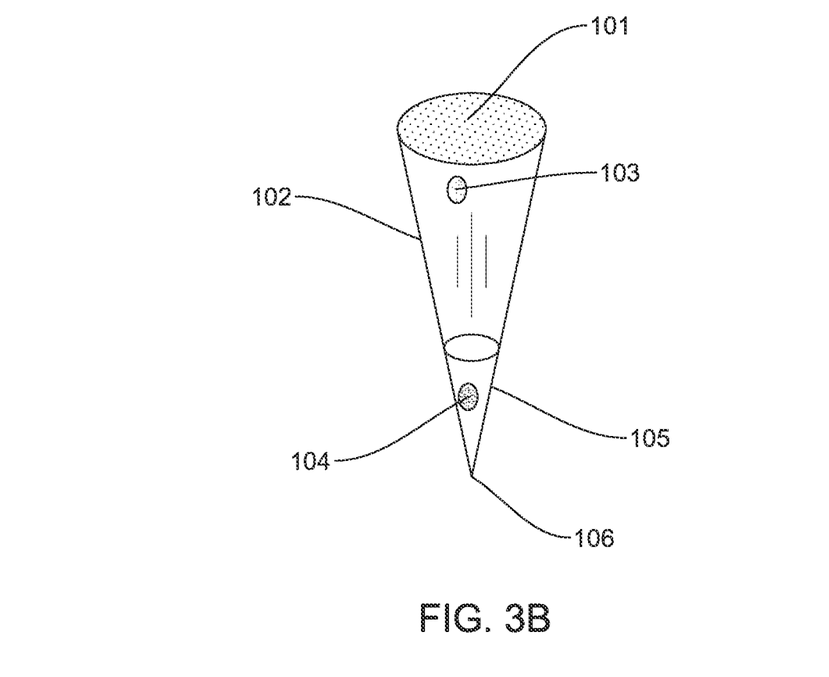
FIG. 3B is a perspective view of the thawing detection apparatus of the current invention in a vertical position and the apex of the housing cone directed downwards.
Figure 3C:
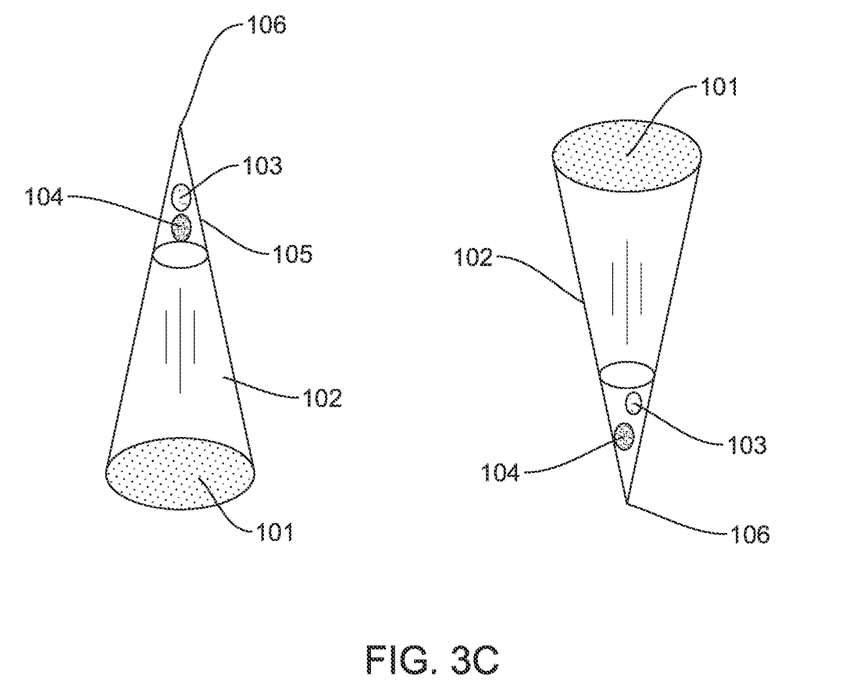
FIG. 3C is a perspective view of the thawing detection apparatus of the current invention in a vertical position showing the high density red ball and low density immersed, invisible and firmly positioned in the apex of the housing cone when the item is in a frozen state.

FIG. 3A-3C illustrates a thaw detection apparatus in an exemplary embodiment of the current invention, wherein the thaw detection apparatus 100 is used to detect whether the frozen item has been exposed to high temperatures and more particularly to more than 0° C. FIG. 3A illustrates the thaw detection apparatus or housing container 100 placed in a vertical position wherein the apex portion 106 is directed downwards and the base portion 101 directed upwards. When the housing container or cone 100 is subject to more than 0° C., the low density object 103 floats and the high density object 104 sinks within the apex portion 106 (opaque part 105) and is invisible. FIG. 3B illustrates the thaw detection apparatus or housing container 100 placed in a vertical position wherein the apex portion 106 is directed upwards and the base portion 101 directed downwards. In this orientation, the low density object 103 floats and is immersed within the apex portion 106 (opaque part 105) and is unseen, whereas the high density object 104 sinks towards the base portion 101 (transparent part 102) and is visible. In FIG. 3C, the thaw detection apparatus 100 is placed in a vertical position wherein the apex portion 106 is upwards or downwards. Accordingly, as long as the frozen item has not been subjected to a high temperature, both the low density and high density objects 103 and 104 are immersed, unseen and positioned within the apex portion 106 when in the frozen state—irrespective of a position of the thaw detection apparatus or housing container 100.

Figure 4A:
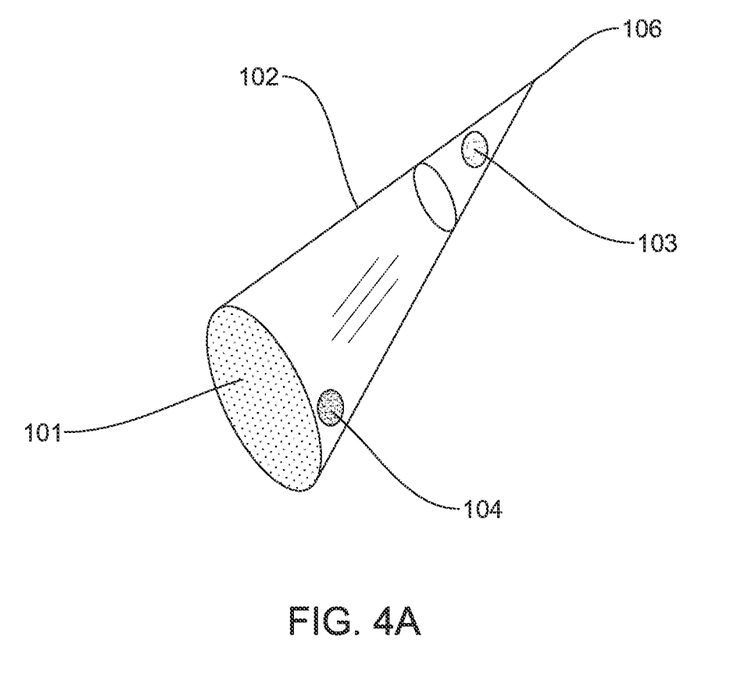
FIG. 4A is a perspective view of the thawing detection apparatus in a diagonal position when the apex of the housing cone is directed upwards.
Figure 4B:
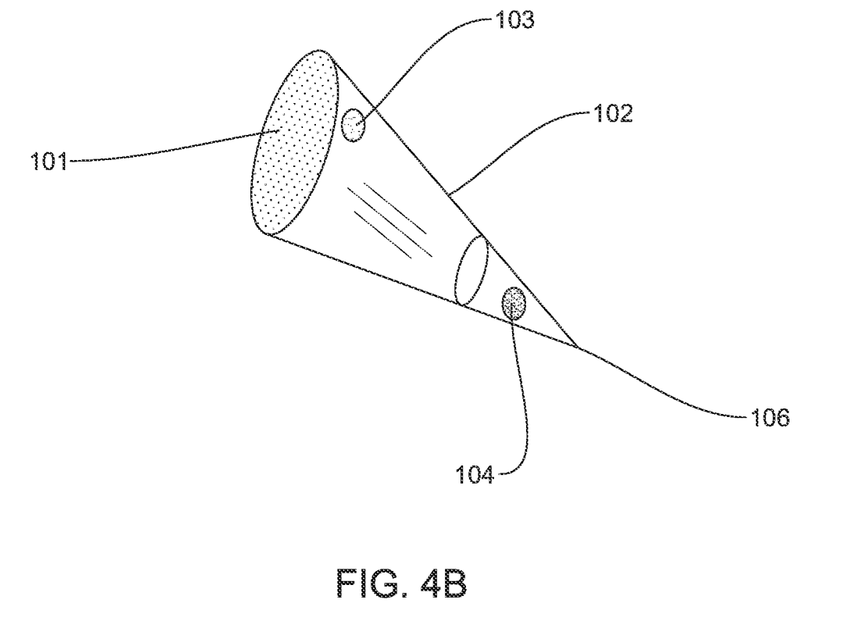
FIG. 4B is a perspective view of the thawing detection apparatus in a diagonal position when the apex of the housing cone is directed downwards.
Figure 4C:
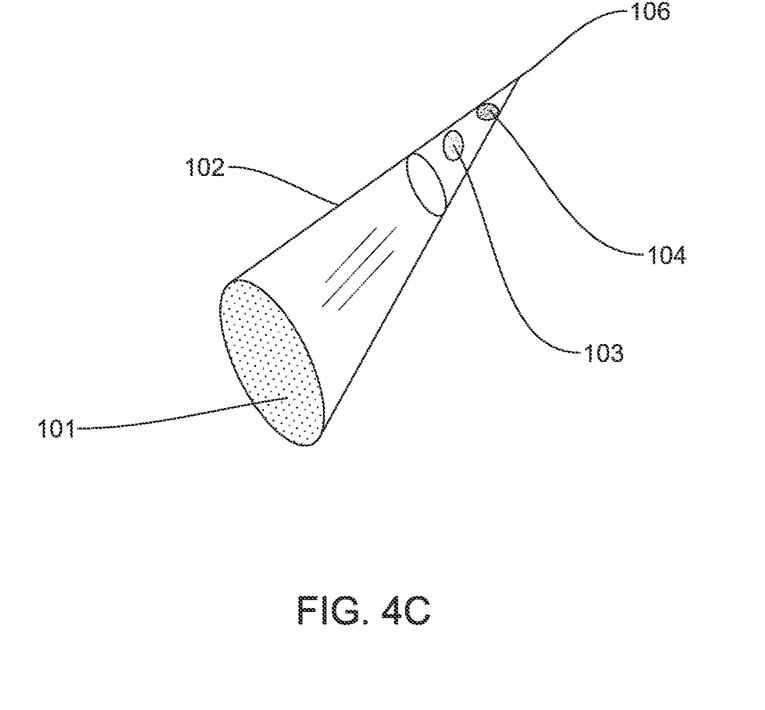
FIG. 4C is a perspective view of the thawing detection apparatus in a diagonal position showing the high density red ball and low density ball immersed, invisible and firmly positioned in the apex of the housing cone when the item is in a frozen state.

FIG. 4A-C depicts the thaw detection apparatus 100 in another embodiment of the current invention, wherein the thaw detection apparatus 100 is used to detect whether the frozen item has been exposed to high temperatures and more particularly to more than 0° C. FIG. 4A shows that the high density object 104 sinks towards the base portion 101 and the low density object 103 floats towards the apex portion 106 (opaque part 105) and is invisible—when the thaw detection apparatus 100 is oriented with the base portion 101 directed diagonally downwards. FIG. 4B shows the thaw detection apparatus 100 oriented with the apex portion 106 directed diagonally downwards. In this orientation, the high density object 104 sinks towards the apex portion 106 and the low density object 103 floats towards the base portion 101 (transparent part 102). FIG. 4C shows the thaw detection apparatus placed in a diagonal position, the apex portion 106 being positioned either upwards or downwards. As shown, as long as the frozen item has not been subjected to a raised temperature, both the low density and high density objects 103 and 104 are immersed, unseen and positioned within the apex portion 106 (in the frozen state)—irrespective of a position of the thaw detection apparatus or housing container 100.

Figure 5:
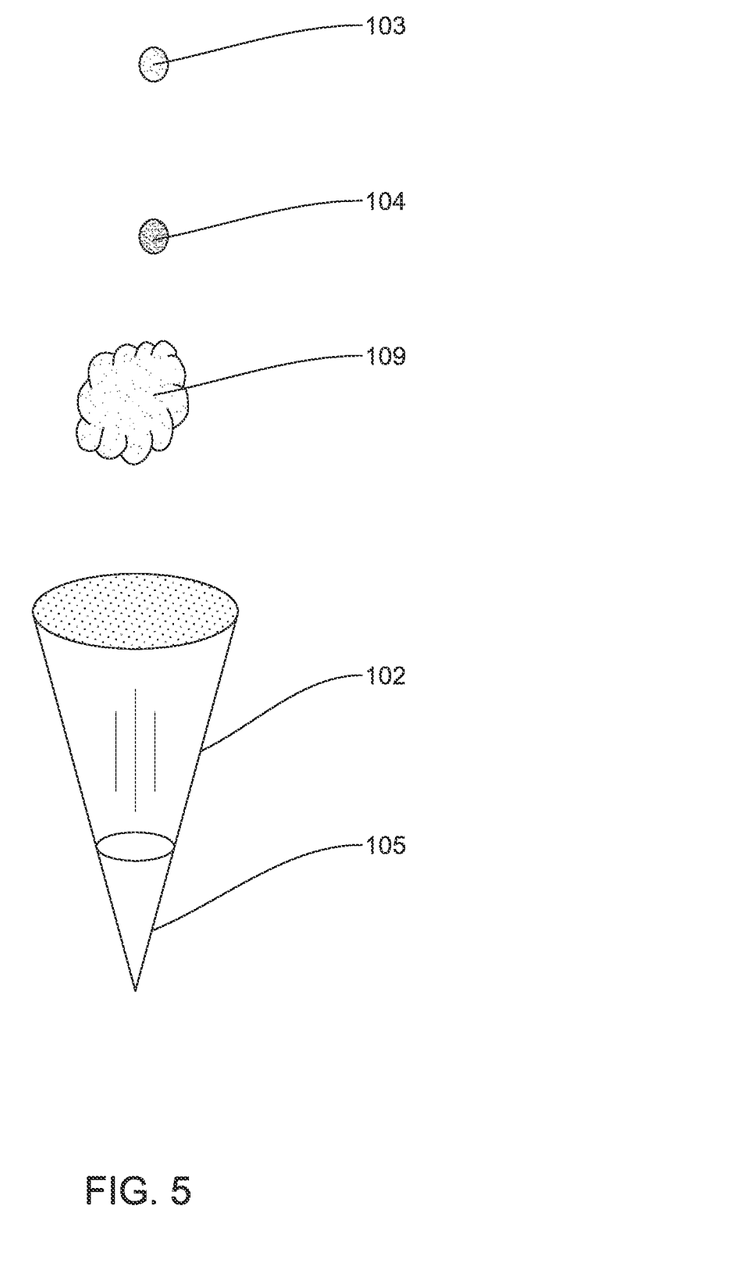
FIG. 5 is an illustration of the main components of the proposed device, in accordance with the present invention.

As shown in FIG. 5, and in accordance with an embodiment of the present invention, 103 is a red high-density polypropylene ball that sinks in water and 104 is an orange low-density polystyrene ball that floats on water, 109 is a filling mixture (comprising grated ice mixed with drops of D-ethanol) and the housing container or cone 100 is a low-density polyethylene cone with a black opaque top part 105. The thaw detection apparatus or housing container 100 is made of a transparent and flexible material (preferably polyethylene) which when subjected to a high temperature leads to the filling solution 109 (comprising grated ice and D-ethanol mixture which melts at temperatures close to 0° C.) to thaw and distort the shape of the housing container 100, and will remain in its original shape when completely frozen.

In some cases, the shape of the housing container or cone 100 is distorted as a result of defrosting, which is another indicator of exposure to high temperatures and poor storage. Also, at least two objects or balls are required for the proposed device, to counter effects of placing the food package in any random direction—such that one or both balls are visible in the transparent portion 102 of the housing container 100 regardless of which direction it may be positioned. Advantages associated with the proposed device and method is that the device is easily manufactured, free of toxins, easy to use, is less expensive and is light weight (thereby not affecting the net weight of the frozen item or food product). This is a useful and reliable device usable with any kind of frozen item or food-stuff, easily usable by health inspectors during inspections of wholesale and retail venues and before the frozen item or food product reaches the consumers (also meeting the needs of various stakeholders including consumers, food safety inspectors and retailers), and may be developed to suit any product provided that the basic working principles are adhered to.

Figure 6:
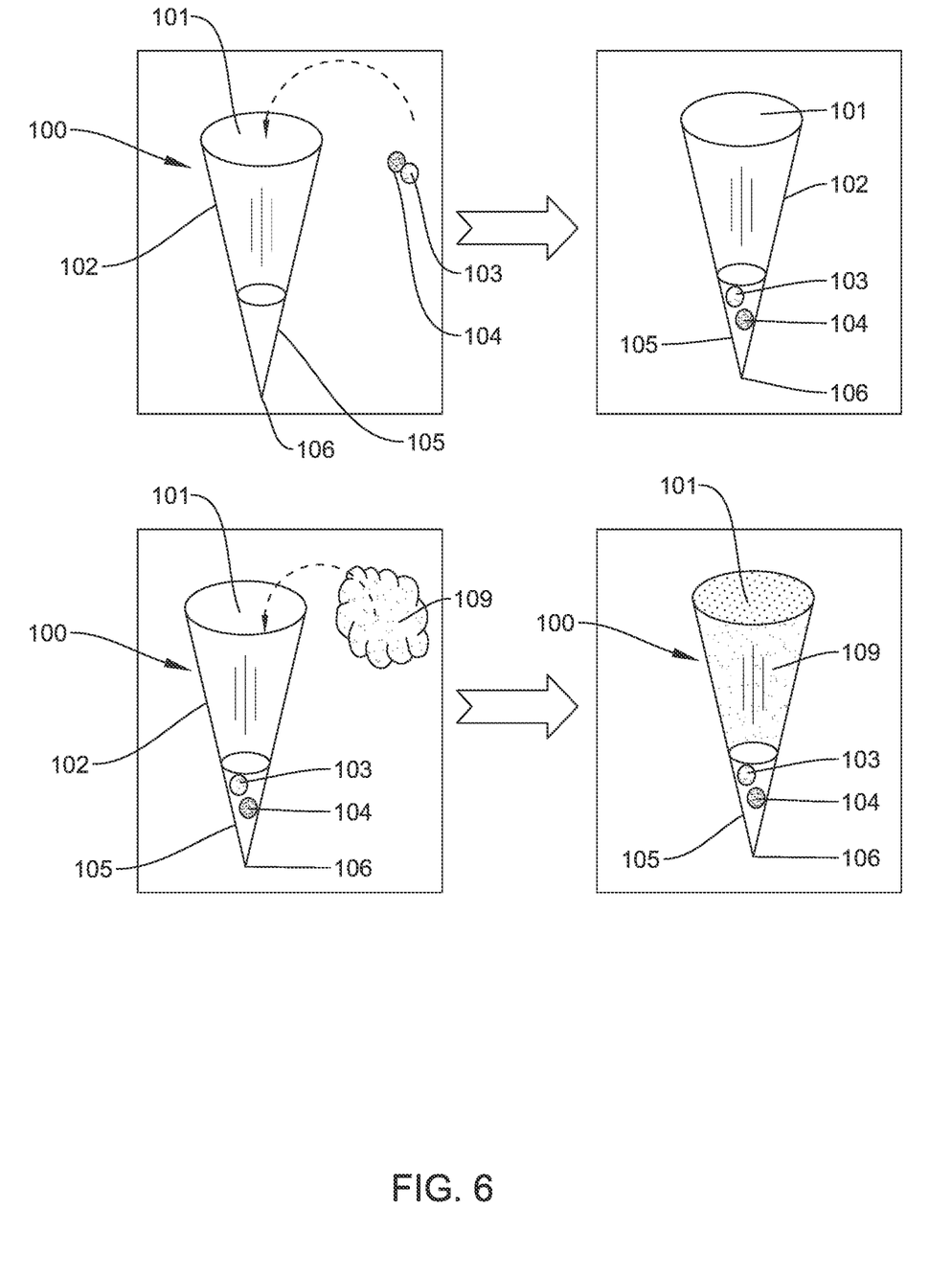
FIG. 6 is a step-by-step depiction of how the proposed device, in accordance with the present invention is assembled or put together.

FIG. 6 shows a step-by-step process of putting together the proposed thaw detection apparatus 100 (a method of manufacturing the apparatus for thaw detection of a frozen item). As a first step, the low density and high density objects 103 and 104 are placed into the cone shaped housing container 100 with the apex portion 106. Subsequently, the filling solution 109 is placed or poured into the housing container 100. As shown, as long as the frozen item has not been subjected to a raised temperature, both the low density and high density objects 103 and 104 are immersed, unseen and positioned within the apex portion 106 (in the frozen state)—irrespective of a position of the thaw detection apparatus or housing container 100. In another embodiment, when subject to high temperatures—one of the objects or balls is visible regardless of the position of the housing container or cone 100. However, when the apex or vertex 106 of the housing container or cone 100 is pointing upwards, water bubbles may be trapped and the object or ball may be visible in the middle of the housing container or cone 100, and shape of the housing container or cone 100 will be distorted—all of which indicate an exposure of the frozen item to a temperature higher than 0° C.

In another embodiment of the present invention, a target temperature may be altered by changing the ratio of water to alcohol included in the grated mixture (filling solution comprising a grated ice and D-ethanol mixture) and according to the type of frozen item or food product it is used with. The proposed invention may also be used with products other than foodstuff which require a low temperature storage such as pharmaceutical and biological products. The addition of a small amount of D-ethanol to the grated ice mixture is intended to ensure that it melts at temperatures close to 0° C. as water normally melts when it reaches a range of 0-4° C. When the device was trialed using a wide range of frozen foodstuffs, it achieved a 100% success rate, thereby proving the feasibility of the proposed simple, cheap and easy to use device.

In an embodiment, the device is vertically heat sealed so the apex or vertex 106 is pointing downwards. The device is stuck to a transparent part on the inside of the food packaging so that the object or ball is visible when defrosting and refreezing occurs. When the object or ball is not visible this indicates that the frozen item or food product has not been exposed to poor storage where the temperature reached higher than 0° C., and is also used to ensure that the instruction manual is clearly printed on the packaging.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. An apparatus for thaw detection of a frozen item, the apparatus comprising:
   a housing container comprising a first transparent section and a second opaque section;
   at least one low density floating object and at least one high density object both encased within the housing container;
   wherein the housing container is filled with a liquid filling mixture in a frozen state, wherein the liquid filling mixture in a liquid state has a greater density than the low density floating object and a lesser density than the high density object, and wherein melting of the liquid filling mixture results in the at least one low density floating object and at least one high density object sinking to render at least one of the objects visible in the first transparent section of the housing container, thereby enabling thaw detection of the frozen item.

2. The apparatus of claim 1, wherein the low density floating object and the high density object are differently colored balls.

3. The apparatus of claim 1, wherein the low density floating object has a density value less than 1 gm/cm$^3$.

4. The apparatus of claim 1, wherein the high density object has a density value greater than 1 gm/cm$^3$.

5. The apparatus of claim 1, wherein the low density floating object is made of a light weight material such as polystyrene.

6. The apparatus of claim 1, wherein the high density object is made of a heavy material such as polypropylene.

7. The apparatus of claim 1, wherein the housing container is conical in structure.

8. The apparatus of claim 7, wherein the first transparent section is towards a base of the housing container and the second opaque section is towards an apex of the housing container.

9. The apparatus of claim 1, wherein the housing container is made of a transparent and flexible plastic material.

10. The apparatus of claim 9, wherein the housing container is made of polyethylene.

11. The apparatus of claim 1, wherein the filling mixture has a melting point of 0 to 4° C.

12. The apparatus of claim 11, wherein the filling mixture comprises a mixture of grated ice and D-ethanol.

13. The apparatus of claim 12, wherein the filling mixture further comprises a white colored food dye.

14. A method of manufacturing an apparatus for thaw detection of a frozen item, the method comprising the steps of:
   placing at least one low density floating object and at least one high density object within a housing container comprising a first transparent section and a second opaque section;
   filling up the housing container with a filling mixture;
   wherein melting of the filling mixture results in the one low density floating object floating in the filling mixture and at least one high density object sinking in the filling mixture, wherein one of the objects is visible in the first transparent section of the housing container, thereby enabling thaw detection of the frozen item.

15. The method of claim 14, wherein the housing container is made of a transparent and flexible plastic material.

16. The method of claim 14, wherein the apparatus is placed in contact with the frozen item during operation.

17. The method of claim 14, wherein the low density floating object has a density value less than 1 gm/cm$^3$.

18. The method of claim 14, wherein the high density object has a density value greater than 1 gm/cm$^3$.

19. The method of claim 14, wherein the filling mixture has a melting point of 0 to 4° C.

20. The method of claim 19, wherein the filling mixture comprises a mixture of grated ice and D-ethanol.

\* \* \* \* \*